(12) United States Patent
Bekkevold et al.

(10) Patent No.: US 6,741,686 B2
(45) Date of Patent: May 25, 2004

(54) CONTROLLING SETUP OR CONTINUATION OF A CALL CHARGED FROM A PRE-PAID GROUP ACCOUNT

(75) Inventors: Jesper Edelbo Bekkevold, Copenhagen (DK); Pirjo Haakana, Tampere (FI)

(73) Assignee: Nokia Corporation, Espoo (FI)

( * ) Notice: Subject to any disclaimer, the term of this patent is extended or adjusted under 35 U.S.C. 154(b) by 22 days.

(21) Appl. No.: 10/030,938

(22) PCT Filed: May 14, 2001

(86) PCT No.: PCT/FI01/00466

§ 371 (c)(1),
(2), (4) Date: Mar. 25, 2002

(87) PCT Pub. No.: WO01/89192

PCT Pub. Date: Nov. 22, 2001

(65) Prior Publication Data

US 2002/0106064 A1 Aug. 8, 2002

(30) Foreign Application Priority Data

May 15, 2001 (FI) .............................................. 20001165

(51) Int. Cl.$^7$ .............................................. H04M 15/00
(52) U.S. Cl. .............................. 379/114.2; 379/114.01; 379/114.15; 379/114.17; 379/144.01; 455/405; 455/406
(58) Field of Search ...................... 379/114.01, 114.15, 379/114.17, 114.18, 114.19, 114.2, 144.01, 115.01, 115.02, 121.01, 121.03, 125, 126, 127.02, 127.04, 127.05; 455/405, 406, 407, 408

(56) References Cited

U.S. PATENT DOCUMENTS

| 5,359,642 | A | * | 10/1994 | Castro .................... 379/121.01 |
| 5,995,822 | A | * | 11/1999 | Smith et al. ................. 455/406 |
| 6,021,189 | A | * | 2/2000 | Vu ......................... 379/144.01 |
| 6,115,613 | A | * | 9/2000 | Jonsson ...................... 455/519 |
| 6,480,591 | B1 | * | 11/2002 | Penfield et al. ......... 379/144.01 |
| 6,618,583 | B1 | * | 9/2003 | Ergezinger .................. 455/406 |

FOREIGN PATENT DOCUMENTS

| WO | WO 98/27715 | 6/1998 |
| WO | WO 98/56160 | 12/1998 |
| WO | WO 99/01998 | 1/1999 |
| WO | WO 01/06753 | 1/2001 |

* cited by examiner

Primary Examiner—Huyen Le
Assistant Examiner—Quoc Duc Tran
(74) Attorney, Agent, or Firm—Pillsbury Winthrop LLP

(57) ABSTRACT

In a prepaid group service, a number of subscribers belonging to a group share one common prepaid group account. In order to minimize the risk of an improper call release, an undercut of the prepaid group account is determined (305) on the basis of at least one parameter; and the undercut is used when deciding (309) if a call, charged from the prepaid group account, can be set up or continued when there is at least another ongoing call which is charged from the prepaid group account.

6 Claims, 3 Drawing Sheets

CONTROLLING SETUP OR CONTINUATION OF A CALL CHARGED FROM A PRE-PAID GROUP ACCOUNT

This is the U.S. National Stage of International Application No. PCT/FI01/00466, which was filed on May 14, 2001, which designated the U.S. and was filed in the English language.

BACKGROUND OF THE INVENTION

The invention relates to controlling the setup or continuation of a call charged from a prepaid group account, particularly when there are at least two ongoing calls charged from the prepaid group account.

In a prepaid service, each prepaid subscription has its own account, the balance of which is reduced during an ongoing call charged from the subscription. In solutions based on an intelligent network, a prepaid subscription is charged in phases and usually at least two network nodes participate in the charging. The balance of the account is monitored in the service control point (SCP), which comprises a current credit, i.e. the maximum amount of money on the account, and a reserved credit, which is the amount of money reserved from the current credit for this call for a certain period of time. The amount of the reserved credit depends on a threshold, which is a network parameter usually expressed as time, and on a price of one time unit for this call. The SCP sends the threshold to the service switching point (SSP). The service switching point is a call monitoring network node, for example a mobile switching centre. When the time indicated by the threshold has elapsed, the SSP reports this to the SCP and at the same time requests another threshold. In response to receiving the report, the SCP updates the current credit by deducting from the current credit the reserved credit. The SCP updates also the reserved credit similarly. After this updating, the SCP checks if the current credit minus the reserved credit exceeds zero. (The outcome can also be called a temporary balance.) If so, a new threshold is given to the SSP for this call and the reserved credit is updated. Otherwise the SCP instructs to release the call. If the user of the subscription releases the call before the threshold elapses, the SSP reports the time used to the SCP. In that case the SCP updates the current credit by deducting from the current credit the cost of the time used and the reserved credit is updated by deducting from it the reserved credit (i.e. the cost of the threshold).

The prepaid subscription can also be a prepaid group subscription, where subscribers belonging to a group share one common prepaid subscription account. In that case there is one current credit and each ongoing call reserves its own credit portion from the current credit, and the reserved credit is the sum of reserved credit portions for ongoing calls. When there are more than one ongoing calls charged from the subscription account, there is a risk of a call requesting a new threshold being released because the current credit minus the reserved credit is zero, although, for example, one second later an ongoing call is released before it has used its threshold. In other words, after that latter call is released, the current credit minus the reserved credit exceeds zero and the first call release was performed in vain. It is also possible that when there are other ongoing calls, a subscriber wanting to make a call does not succeed because the current credit minus the reserved credit is (temporarily) zero. This can happen to any group regardless of its size or the amount of the current credit, since any number of calls charged from the group account can be made simultaneously.

One way to minimize the problem is to use small thresholds. This solution, however, increases signalling between the SSP and the SCP, and thus also the load on the SSP and SCP, especially when the subscribers are roaming.

BRIEF DESCRIPTION OF THE INVENTION

An object of the invention is to provide a method and an apparatus implementing the method to minimize the above-mentioned problem. The objects are achieved with a method and a network node which are characterized in what is disclosed in the independent claims. The preferred embodiment of the invention are set forth in the dependent claims.

The invention is based on realizing the problem and minimizing it by determining a negative limit for the group subscription. The negative limit is determined on the basis of at least one parameter. Thus the negative limits for different groups may differ. It is even possible that the negative limit for one group varies over time or there are different negative limits for different kinds of group members. The negative limit indicates how much the account balance can be below the preset minimum balance. Consequently, the negative limit can also be called an undercut. The most important advantage of the invention is that a risk for an improper call release is minimized, and, with the use of at least one parameter, the possible losses to a service provider can also be minimized.

BRIEF DESCRIPTION OF THE FIGURES

The invention will be described in greater detail by means of preferred embodiments with reference to the accompanying figures, in which.

DETAILED DESCRIPTION OF THE INVENTION

Figure 1:
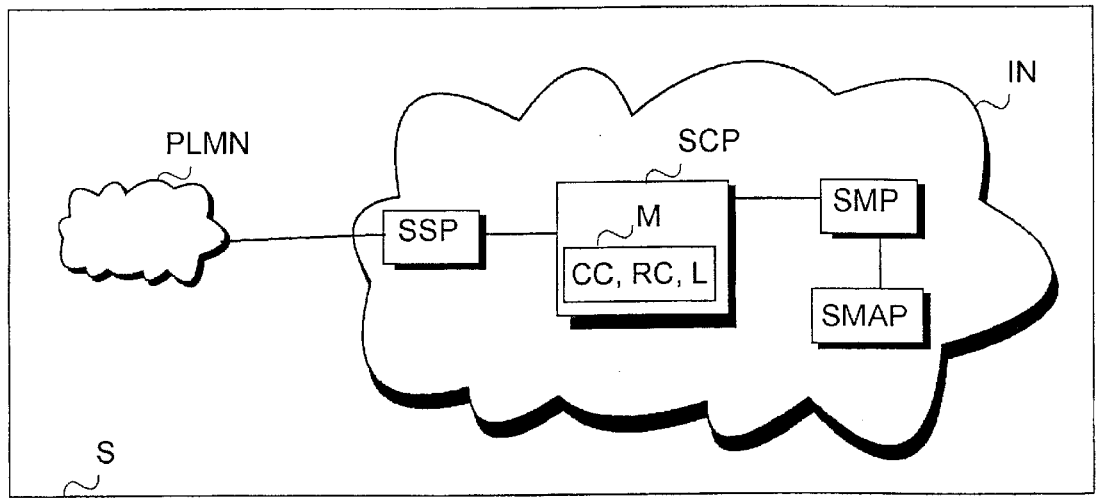
FIG. 1 illustrates the basic elements of prepaid group service accounting.

FIG. 1 is a block diagram of a telecommunications system S equipped with an arrangement according to a preferred embodiment of the invention. The telecommunications network is assumed to be a public land mobile network PLMN; however, the invention is not limited to this particular type of network. The invention can be used in any telecommunication systems where prepaid groups have subscription information stored in the system. A prepaid group refers to a group of one or more subscribers using one prepaid group subscription, i.e. users of a prepaid subscription sharing one common prepaid subscription account. Subscribers belonging to a group are also called members. The member of a group can be a mobile subscriber, a fixed subscriber or a PBX (Private Branch Exchange) subscriber. A mobile subscriber can be a roaming subscriber or a non-roaming subscriber. Thus, a group subscription may include several different kinds of subscribers. The group can also have one or more external parties who can recharge the group's subscription account. However, the external party is not a member of the group. The external party can be seen as an Internet-enabled group administrator. The external party can view all group information, recharge the group's subscription account and activate the subscription as described below. In other words, the external party is an Internet-enabled user with administrative means, not a member of the group (using a phone).

The embodiment illustrated in FIG. 1 makes use of Intelligent Network technology. An intelligent network IN is able to provide a subscriber of a telecommunications network, such as a wired network or a mobile telephone network, with a variety of services. The invention and its background will be described by using the terminology of recommendation ETS 300 374-1 Corel-NAP, but the invention can also be employed in intelligent networks or execution platforms of the intelligent network kind implemented according to other intelligent network standards (such as ANSI, AIN, WIN or CAMEL). Execution platforms of the intelligent network kind include platforms that employ the control principles of an intelligent network. In the present application, the control principles of the intelligent network refer to a contact made to a control function on the basis of triggering information and to controlling a connection by means of a state model. An entity to be controlled can also operate only on external impulses wherefrom triggers are carried out, in which case a state model is not necessarily needed. In principle, these execution platforms only differ from the intelligent network in that no IN protocol is used between the SCP and SSP, for example, but an IP protocol, for example, is used instead. In addition, they may differ with respect to the impulse leading to triggering: in the intelligent network, triggering takes place when a certain phase of a call is reached, but in other protocols, triggering can be generated by an external or internal impulse. The invention can also be applied to call control protocols such as Parlay Application Protocol Interface (API) or Open System Architecture (OSA) being developed.

In the present application the term call, besides referring to a common call, also refers to other, possibly virtual, connection states which which user data transmission is associated, such as data session or packet data transmission. Examples include a packet radio session (such as a GPRS session), voice IP (VoIP) session and multimedia session according to H.323.

FIG. 1 shows some elements of an intelligent network IN which are relevant to the understanding of the invention, such as the SSP (Service Switching Point) which is a network element performing a service switching function (SSF). The SSP may be a mobile services switching centre MSC, which includes the SSF. The SSF is an interface between a conventional call control function CCF and a service control function SCF of the intelligent network. In prepaid service, the SSP requests new thresholds from the SCP and monitors the usage of a threshold. When the caller has used the threshold, the SSP sends a report indicating that the threshold has been used and requesting a new threshold. When the caller (or the called one) releases the call, the SSP sends a report indicating at least the used part of the threshold and the fact that the call has been released.

The network element performing the SCF is called a service control point SCP. An intelligent network service is produced by the service switching point SSP inquiring instructions from the service control point SCP by means of messages to be transmitted across the SSP/SCP interface upon the encounter of detection points associated with the service. In association with an intelligent network service, a service program is started at the service control point SCP, the operation of the program determining the messages transmitted by the SCP to the SSP at each stage of a call. The prepaid service is an intelligent network service. Charging the account of a prepaid subscription is usually handled in the SCP using a current credit CC and reserved credit RC fields in the database M of the SCP. The current credit CC contains the amount of current credit of the subscription in either time or monetary units. The reserved credit RC is the sum of reserved portions from the current credit, each portion being preferably equal to the cost of a threshold given to an ongoing call. In order to enable the SCP to charge according to the invention, the database M comprises at least one new field L. This field L indicates directly or indirectly the amount of the negative limit allowed to this group subscription and/or to this member of the group. The accounting according to different embodiments of the invention is described in more detail in FIGS. 2, 3 and 4.

The service management access point SMAP provides selected users, such as service providers and network operators, with access to the service data of the service management point SMP through a public telephone network, such as the PSTN or the ISDN, a cellular radio network (such as the GSM) or a public data network (X.25, the Internet), and an open interface. The SMAP interacts directly with a service management point SMP. Furthermore, the SMAP can provide access to a network element of another telecommunications network, such as the home location register HLR comprising data related to subscriber information and telecommunications services. Functionally, the SMAP comprises a service management access function.

In the example illustrated in FIG. 1, group-specific information is stored in a database located in the SMP. Group-specific information relates to a prepaid group subscription. Alternatively, the information may be located in different databases and/or in some other network element, such as a home location register HLR.

Group-specific information according to the invention comprise at least the total amount of credit in the subscription account (i.e. the current credit) and at least one parameter indicating directly or indirectly for that group or for group members either how big the negative limit can be or how to determine the negative limit. This information or the current credit and information deduced from the parameter (s) are preferably propagated to the SCP when the prepaid service logic is initiated for this group. The parameter can indicate what kind of a group is concerned, and that way indicate the negative limit. There can be different negative limits for different kinds of groups, for example a family group, a company group or a club group. The number of group members may affect the negative limit. Also the service used may affect the negative limit. It is also possible that each type of group member has its own value for the negative limit, for example the negative limit for fixed members is lower than the negative limit for roaming mobile members. The actual negative limit can be estimated from statistical analysis of call-lengths for typical group members, for example. The parameter can be a memory address of a dynamically changing value for the negative limit. Thus the invention does not restrict the operator's freedom to choose and define both the parameter(s) and the way to calculate the negative limit(s). It is to be understood that the examples disclosed in the present description are purely illustrative.

The negative limit is preferably based on a monetary value, since the cost of a threshold can vary a lot. For example, a 90-s threshold can cost FIM 1 when it is a local call or FIM 4 when it is a long distance call abroad.

The present invention can be implemented in existing network nodes. They all have processors and a memory with which the inventive functionality described below can be implemented. All alterations required for the implementation of the invention can be executed as added or updated software routines and/or with application circuits (ASIC). The functions described below may be located in one network node or some of them may be in one node and the others in other nodes regardless of how they are located in the examples used to illustrate the invention.

Figure 3:
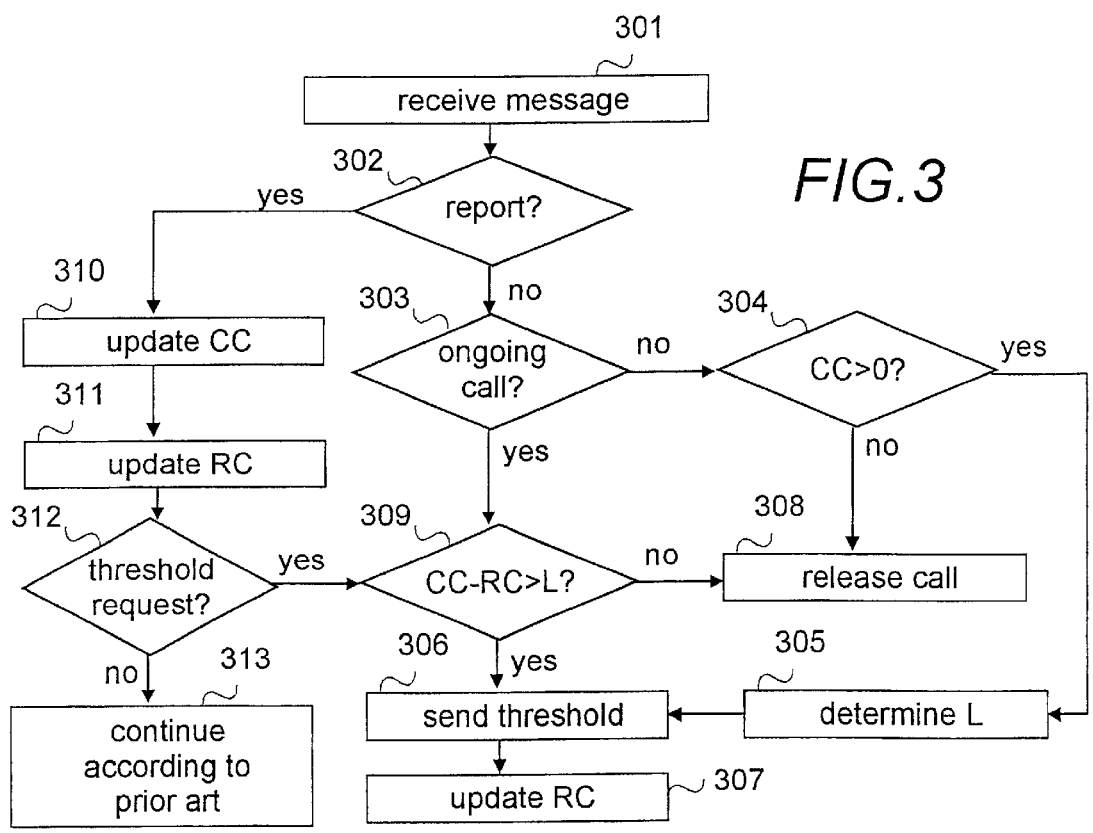
FIGS. 2, 3 and 4 are flow charts illustrating the functionality of an SCP in a first, second and third preferred embodiment of the invention.
Figure 2:
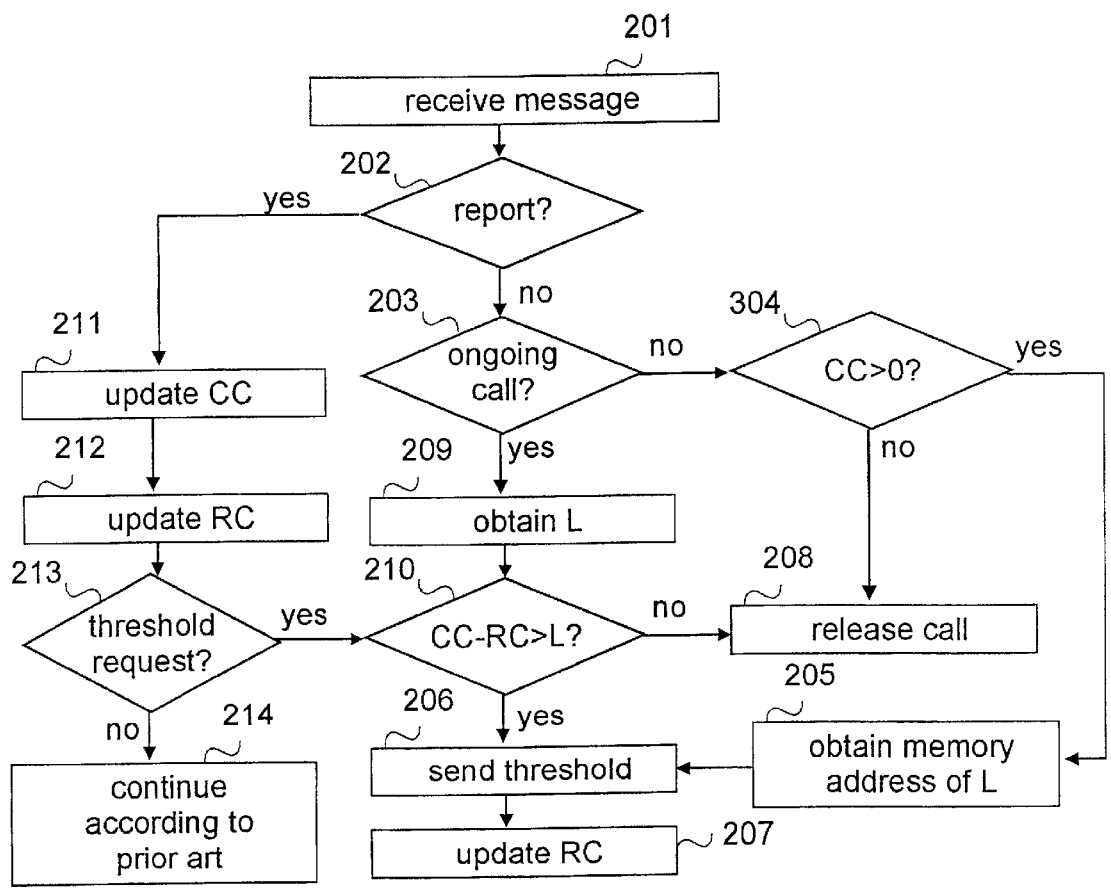
Figure 4:
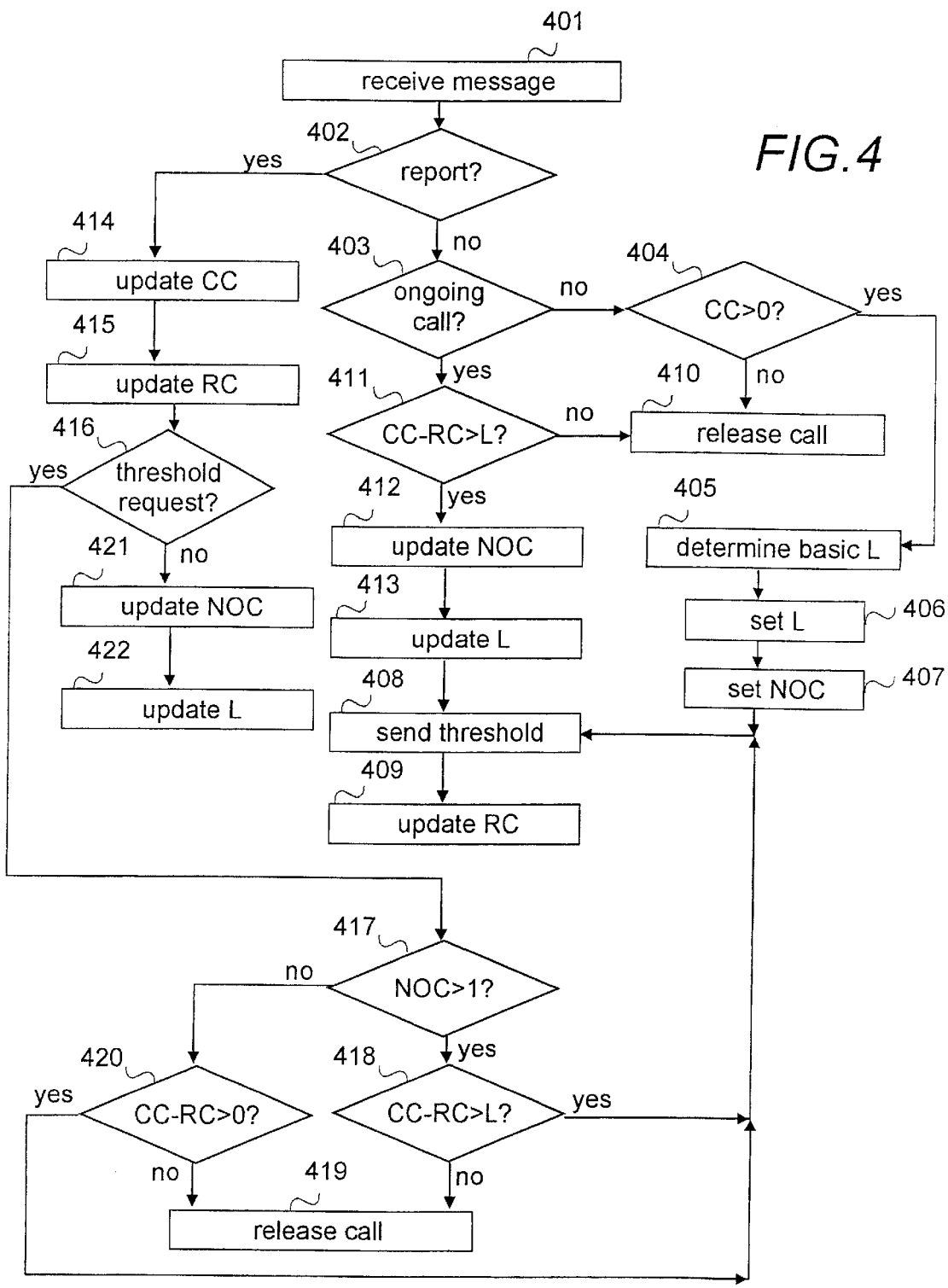

FIGS. 2, 3 and 4 illustrate the functionality of the service control point SCP in preferred embodiments, in which it is assumed that the current credit CC of the subscription is down-propagated from the SMP database to the SCP database. Any credit changes are then up-propagated from the SCP database to the SMP database. This information transmittance is not shown in FIGS. 2, 3 and 4. Neither is the decision on the size of a threshold or the calculation of the cost of a threshold shown in FIGS. 2, 3 and 4. It is also assumed that the SSP monitors the call and informs the SCP when the threshold is used or the call is released by the caller (or the called one). In the embodiments illustrated in FIGS. 2, 3 and 4, it is further assumed that the current credit is in monetary units and the negative limit does not depend on the characteristics of one group member. In FIGS. 2, 3 and 4, it is further assumed that the preset minimum balance of the account is zero. The minimum balance is a 'border' restricting the subscribers' ability to make, continue and receive calls charged from the account.

FIG. 2 illustrates the functionality of the service control point SCP in a first preferred embodiment of the invention. In the first preferred embodiment of the invention, it is assumed that the amount of the negative limit L varies dynamically and the parameter in group-specific information and the field in the SCP are both memory addresses.

A message is received in step 201 from the SSP. In step 202 it is checked if the message is a report. If the message is not a report, it is a call setup, and in step 203 it is checked if there is already at least one ongoing call charged from this group account. If not, it is checked in step 204 if the current credit CC exceeds zero. If so, in step 205, the SCP obtains the memory address of the negative limit L for this group. The group-specific information may comprise the memory address directly. The group-specific information may also indicate the memory address indirectly by having a parameter indicating that for this group a memory address of a family group is used, for example. Then the threshold for this call is sent, in step 206, to the SSP and the reserved credit RC is updated, in step 207, by adding to the reserved credit the cost of the threshold sent in step 206.

If the current credit exceeds zero (step 204), the call is released in step 208.

If there is at least one ongoing call (step 203), the negative limit L is obtained in step 209 by using the memory address obtained in step 205. A check is then made, in step 210, to see if the current credit CC minus the reserved credit RC exceeds the negative limit L. If so, the process continues in step 206 where the threshold is sent. If not, the process continues in step 208, where the call is released.

If the message is a report (step 202), the current credit CC is updated, in step 211, by deducting from the current credit CC the amount of credit used and indicated in the report. The reserved credit RC is also updated, in step 212, by deducting from the reserved credit the cost of the threshold reserved for this call and indicated by the report received (regardless of how much of the threshold was used). After that it is checked, in step 213, if the report is also a threshold request. If so, the process continues in step 209, where the negative limit L is obtained.

If the report is not a threshold request (step 213), it indicates that the caller or the called party has released the call and the process continues according to prior art (step 214).

FIG. 3 illustrates the functionality of the service control point SCP in a second preferred embodiment of the invention. In the second preferred embodiment of the invention, it is assumed that the amount of the negative limit L is constant for a group.

A message is received in step 301 from the SSP. In step 302 it is checked if the message is a report. If the message is not a report, it is a call setup, and in step 303 it is checked if there is already at least one ongoing call charged from this group account. If not, it is checked in step 304 if the current credit CC exceeds zero. If so, in step 305, the SCP determines the negative limit L for this group. The group-specific information may comprise the negative limit L directly. The group-specific information may also indicate the negative limit L indirectly by having a parameter indicating that for this group a negative limit L of a family group is used, for example. It is also possible that the parameter indicates how many group members there are and the negative limit L is then calculated by multiplying the number of group members by a cost of one threshold in the home network, for example. The parameter can also be a memory address of the negative limit L for this group. Thus the constant negative limit L can be determined in numerous various ways. The above-described ways are only examples. After determining the negative limit L, the threshold for this call is sent, in step 306, to the SSP and the reserved credit RC is updated, in step 307, by adding to the reserved credit the cost of the threshold sent in step 306.

If the current credit does not exceed zero (step 304), the call is released in step 308.

If there is at least one ongoing call (step 303), a check is made, in step 309, to see if the current credit CC minus the reserved credit RC exceeds the negative limit L. If so, the process continues in step 306 where the threshold is sent. If not, the process continues in step 308, where the call is released.

If the message is a report (step 302), the current credit CC is updated, in step 310, by deducting from the current credit CC the amount of credit used and indicated in the report. The reserved credit RC is also updated, in step 311, by deducting from the reserved credit the cost of the threshold received for this call and indicated by the report received (regardless of how much of the threshold was used). After that it is checked, in step 312, if the report is also a threshold request. If so, the process continues in step 309, where a check is made to see if the current credit minus the reserved credit exceeds the negative limit L.

If the report is not a threshold request (step 312), it indicates that the caller or the called party has released the call and the process continues according to prior art (step 313).

FIG. 4 illustrates the functionality of the service control point SCP in a third preferred embodiment of the invention. In the third preferred embodiment of the invention, it is assumed that the amount of the negative limit L depends on the number of ongoing calls, and the negative limit L is calculated by multiplying the number of ongoing calls with a basic negative limit (basic L). The basic negative limit is a value indicated by the parameter in the group-specific information. It can be a value of one threshold in the home network for the subscription type, for example.

A message is received in step 401 from the SSP. In step 402 it is checked if the message is a report. If the message is not a report, it is a call setup, and in step 403 it is checked if there is already at least one ongoing call charged from this group account. If not, a check is made in step 404 to see if the current credit CC exceeds zero. If so, in step 405, the SCP determines the basic negative limit, basic L, for this group. The group-specific information may comprise the basic L directly. The group-specific information may also indicate the basic L indirectly by having a parameter indicating that for this group a basic L of a family group is used, for example. After determining the basic L, the negative limit L is set to be the basic L in step 406 and the number of ongoing calls NOC is set to be one in step 407. Then the threshold for this call is sent, in step 408, to the SSP and the reserved credit RC is updated, in step 409, by adding to the reserved credit the cost of the threshold sent in step 408.

If the current credit does not exceed zero (step 404), the call is released in step 410.

If there is at least one ongoing call (step 403), a check is made, in step 411, to see if the current credit CC minus the reserved credit RC exceeds the negative limit L. If so, the number of ongoing calls NOC is updated, in step 412, by adding one to it. The negative limit L is also updated, in step 413, by adding the basic L to it (or by multiplying the basic L with the number of ongoing calls). Then the process continues in step 206 where the threshold is sent.

If the current credit CC minus the reserved credit RC does not exceed the negative limit L (step 411), the process continues in step 410, where the call is released.

If the message is a report (step 402), the current credit CC is updated, in step 414, by deducting from the current credit CC the amount of credit used and indicated in the report. The reserved credit RC is also updated, in step 415, by deducting from the reserved credit the cost of the threshold received for this call and indicated by the report received (regardless of how much of the threshold was used). After that it is checked, in step 416, if the report is also a threshold request. If so, it is checked, in step 417, if there are more than one calls going on. In other words, it is checked if the number of ongoing calls NOC exceeds one. If so, a check is made, in step 418, to see if the current credit CC minus the reserved credit RC exceeds the negative limit L. If so, the process continues in step 408, where the threshold is sent. If not, the call is released in step 419.

If the number of ongoing calls NOC does not exceed one (step 417), there is only one ongoing call, and there is no need for the negative limit. Because of this, it is checked, in step 420, if the current credit CC minus the reserved credit RC exceeds zero. If so, the process continues in step 408, where the threshold is sent. If not, the call is released in step 419. Since the reserved credit ought to be zero in this case, it is possible to check in step 420 if the current credit exceeds zero.

If the report is not a threshold request (step 416), it indicates that the caller or the called party has released the call and the number of ongoing calls NOC is updated, in step 421, by deducting one from the NOC. The negative limit L is also updated, in step 422, by deducting from the negative limit L the basic L. (Alternatively the negative limit can be updated by multiplying the basic L with the updated NOC).

In some other embodiment based on the third embodiment, the number of ongoing calls (step 417) need not be checked. In the embodiment, steps 407, 412, 420 and 421 can be skipped.

The steps described above in FIGS. 5, 6 and 7 are not in an absolutely chronological order, and some of them can be performed simultaneously or differing from the given order. For example, step 206 can be performed simultaneously with step 207. Other functions can also be performed between the steps. Some of the steps can be left out.

It should be emphasized that the above are only illustrative examples of how to implement the invention and determine the negative limit. Also other implementation solutions and determination solutions can be used. It is essential that when there are simultaneously at least two ongoing calls which are charged from the account, a negative limit is determined and the current credit minus the reserved credit is compared with the negative limit.

Even though in the above, the invention has been explained, for the sake of clarity, assuming that the negative limit does not depend on what kind of group members are making calls, it is obvious to a person skilled in the art how to apply the invention when the negative limit depends on what kind of group members are making calls. For example, in an embodiment based on the third embodiment of the invention, the basic L is determined for each caller, so that between steps 411 and 412 there is a step in which a basic L for this caller is determined.

Even though in the above, the invention has been explained assuming that the SSP monitors the thresholds, the invention is, however, not limited solely to the solution, but it is obvious to a person skilled in the art that the invention can also be applied to systems where the SCP also monitors the thresholds by means of an internal timer, for example.

Even though in the above, the invention has been explained assuming that if the current credit is zero, no calls can be made if there is no ongoing call, the invention is, however, not limited solely to the solution, but it is obvious to a person skilled in the art that the invention can also be applied to systems where some other amount, positive or negative, is used instead of zero as a preset minimum balance.

Even though in the above it is assumed that the reserved credit for a call is deduced from the current credit only after it has been used, it is obvious to a person skilled in the art how to apply the invention to systems where there is no separate reserved credit, but the portion reserved for a call is deduced from the current credit during reservation, and if the portion of reserved credit is not totally used, the unused part of it will be added to the current credit. In the systems the current credit is compared with the negative limit.

It is to be understood that the above description and the figures related to it are only intended to illustrate the present invention. It will be obvious to a person skilled in the art that the invention may be modified in different ways without deviating from the scope and spirit of the invention disclosed in the appended claims.

What is claimed is:

1. A method of controlling the setup or continuation of a call charged from a prepaid group account having a preset minimum balance, the preset minimum balance restricting ability to make, continue and receive calls charged from the prepaid group account, the method comprising:

determining, on the basis of at least one parameter, an undercut of the preset minimum balance for the prepaid group account, the undercut indicating how much the prepaid group account balance can be below the present minimum balance; and using the undercut when deciding if a call, charged from the prepaid group account, can be set up or continued when there is at least another ongoing call which is charged from the prepaid group account.

2. The method of claim 1, further comprising:

maintaining a current credit indicating the maximum amount of money in the prepaid group account;

reserving a portion from the current credit for each call;

maintaining a reserved credit indicating the sum of reserved portions;

calculating a temporary balance by deducting the reserved credit from the current credit;

comparing the temporary balance with the undercut when deciding if a call can be set up or continued when there is at least another ongoing call which is charged from the prepaid group account; and allowing the setup or continuation if the temporary balance exceeds the undercut.

3. The method of claim 1, further comprising:

increasing the undercut in response to an allowed call setup; and decreasing the undercut in response to the release of a call charged from the prepaid group account.

4. A network node, responsible for controlling the setup or continuation of a call charged from a prepaid group account having a preset minimum balance, the preset minimum balance restricting ability to make, continue and receive calls charged from the prepaid group account, the network being arranged to have access to group-specific information, wherein the network node is arranged to determine, on the basis of at least one parameter defined in the group-specific information, an undercut of the preset minimum balance for the prepaid group account, the undercut indicating how much the group account balance can be below the preset minimum balance; and to use the undercut when deciding if a call, charged from the prepaid group account, can be set up or continued when there is at least another ongoing call which is charged from the prepaid group account.

5. The network node of claim 4, comprising a memory for storing a memory address of the undercut indicated by the parameter, and further being arranged to obtain the undercut when making said decision.

6. The network node of claim 4, comprising a memory for storing the undercut indicated by the parameter, and further being arranged to store the undercut in the memory after the undercut has been determined, and to use the stored undercut when making said decision.

* * * * *

UNITED STATES PATENT AND TRADEMARK OFFICE
CERTIFICATE OF CORRECTION

PATENT NO. : 6,741,686 B2
DATED : May 25, 2004
INVENTOR(S) : Jesper Edelbo Bekkevold et al.

It is certified that error appears in the above-identified patent and that said Letters Patent is hereby corrected as shown below:

<u>Title page,</u>
Item [30], Foreign Application Priority Data, replace
"May 15, 2001        20001165" with -- May 15, 2000        20001165 --.

Signed and Sealed this

Seventh Day of September, 2004

JON W. DUDAS
*Director of the United States Patent and Trademark Office*